United States Patent
Bordynuik

(10) Patent No.: US 7,115,872 B2
(45) Date of Patent: Oct. 3, 2006

(54) PORTABLE RADIATION DETECTOR AND METHOD OF DETECTING RADIATION

(76) Inventor: John William Bordynuik, 1220 Line 3-RR6, Niagara-on-the-Lake, Ontario (CA) L0S 1J0

(*) Notice: Subject to any disclaimer, the term of this patent is extended or adjusted under 35 U.S.C. 154(b) by 267 days.

(21) Appl. No.: 10/731,136

(22) Filed: Dec. 10, 2003

(65) Prior Publication Data

US 2005/0127300 A1    Jun. 16, 2005

(51) Int. Cl.
*G01T 1/20*    (2006.01)
(52) U.S. Cl. .................. 250/361 R; 250/370.07; 250/370.11
(58) Field of Classification Search ............ 250/361 R, 250/370.11, 370.07
See application file for complete search history.

(56) References Cited

U.S. PATENT DOCUMENTS 4,695,730 A * 9/1987 Noda et al. ............ 250/370.09
5,256,879 A * 10/1993 McNulty et al. ........ 250/370.06
6,433,340 B1 * 8/2002 Penn ....................... 250/361 R
2003/0075685 A1 * 4/2003 Yamakawa ............. 250/370.11
2003/0165211 A1   9/2003 Grodzins et al.

* cited by examiner

*Primary Examiner*—Constantine Hannaher
(74) *Attorney, Agent, or Firm*—Clark & Brody

(57) ABSTRACT

A radiation detector for dirty bomb and lost radioactive source detection applications is enclosed in a small pager-style housing made of impact resistant ABS plastic and epoxy binder composite which is relatively transparent to alpha, beta, gamma, fast neutron, and x-ray radiation, while also being optically opaque and providing a protective enclosure for the radiation detector components disposed inside the housing. The detector combines indirect radiation detection using a scintillator and photodiode and direct radiation detection by placing the photodiode and a high gain amplifier in the path of radiation. Semiconductors in these components generate an electrical signal from high energy radiation, whereby an alarm indicates the presence of the radiation.

19 Claims, 2 Drawing Sheets

PORTABLE RADIATION DETECTOR AND METHOD OF DETECTING RADIATION

FIELD OF THE INVENTION

The invention relates to radiation detectors generally, and relates more particularly, but not exclusively, to such detectors as are used for detecting radiation emitted from a dirty bomb or lost radioactive source.

BACKGROUND ART

The term "radiation" as used herein refers to any type of ionizing radiation of various energies, including fast neutron radiation.

Radiation detectors are used in medicine, industry, and research for dosimetry, imaging, and homeland security applications. Most radiation detectors are able to detect only specific types of radiation, and at narrow intensity ranges. A dirty bomb can contain any type of radioactive isotope, so there is a need to detect different kinds of ionizing radiation, including fast neutron radiation from fissionable materials, in a single radiation detector. Since the intensity of radiation is inversely proportional to the square of its distance from the source of the radiation, a homeland security radiation detector must also detect a wide range of radiation intensities.

For homeland security purposes, it is impractical to install radiation detectors on every street corner, so there is a need for a small, portable, rugged radiation detector that can travel with many people throughout a community for wide-area scanning.

The present invention solves this need by providing radiation detector that can detect many different types of radiations and intensities while continuing to function when exposed to high levels of radiation, including a small, rugged, pager-like radiation detector.

SUMMARY OF THE INVENTION

It is a first object of the present invention to provide an improved radiation detector.

Another object of the present invention is a method of detecting both high and low energy radiation using a single device.

A further object of the invention is to provide a portable radiation detector that can be easily carried on one's person.

Other objects and advantages of the present invention will become apparent as a description thereof proceeds.

One mode of the invention entails a radiation detector with a housing having a ABS composite wall which is opaque, mechanically rugged, and highly transparent to even low energy ionizing radiation. The inventive detector can report the level of radioactivity by turning a bright LED on and off and/or sounding a buzzer, and/or vibrating. A wide range detection of different radiation types and radiation intensities is accomplished by integrating direct and indirect conversion type detectors. According to the invention, an indirect conversion type detection mode is provided that is designed to convert radiation into light and then perform photoelectric conversion of the converted light into electric signals. The indirect conversion type detector mode includes a scintillator coupled to a photodiode and amplifier, preferably an integrated unit.

Coupled with the indirect conversion type detection is a direct conversion type detector designed to convert incident radiation directly into electrical signals. The direct conversion type detector in this invention is an integrated photodiode and high-gain amplifier. The direct conversion of detected radiation is achieved by allowing incident radiation to strike the depleted regions of the semiconductors in the photodiode and high gain amplifier. The radiation detector is carefully configured to combine both direct and indirect conversion type detectors into the same integrated photodiode and high-gain amplifier. The result is a small, highly sensitive, wide-range radiation detector. The radiation detector can be coupled to an integrated A/D converter and processor. The A/D converter samples the electrical signal from the high-gain amplifier and provides the processor with signal amplitude information. The processor contains firmware to analyze the electrical signal and ignore or filter noise. In the event that the processor determines that a natural radioactive isotope is in range, it will inform the holder by one or more of audible, vibratory and visual means.

The invention also entails an alpha, beta, gamma, X-Ray, and fast neutron radiation detector that comprises a scintillating body inside a housing. The scintillating body converts ionizing radiation passing from outside the housing into the scintillating body to light. Also provided is a light-sensitive device and high gain amplifier optically coupled to the scintillating body for converting the light to an electrical signal. The light-sensitive device, e.g., a photodiode, and the high gain amplifier also directly convert incident radiation striking the depletion regions inside the semiconductors found in these devices to an electrical signal. The photodiode and high-gain amplifier are configured in such a way that they are used both as a direct and indirect conversion type detector.

The scintillation body can be a rare earth phosphor such as terbium-activated gadolinium oxysulfide, and the scintillator can be wrapped around the photodetector to enhance the omni directional detecting abilities of the detector. The housing can be made of an optically opaque substance such as heat-shrink tubing and heat-curable epoxy binder. The light sensitive device can be an integrated photodiode array and high gain amplifier.

In providing an alert mechanism for detected radiation, vibrating mechanism such as a motor with an off-balance rotor can be mounted within the housing and powered by the housing power source to cause the housing to vibrate.

In a preferred mode, the detector is configured as a hand-held device that is particularly adapted at detecting dirty bombs and lost radioactive isotopes. The hand held detector has a housing having a wall made of a predominantly epoxy composite material binder capable of withstanding temperatures from −50 to +70 degrees Celsius and sufficiently thick to withstand vibrations and being optically opaque. Disposed inside the housing is the radiation detector described above in combination with an analog to digital converter that is coupled to the radiation detector output. A processor, also inside the housing, interfaces with the A/D converter for filtering ambient noise from detected radioactivity and control alarm indicator states.

A light, buzzer, and/or vibrating mechanism interfaces with the processor for alerting the holder to detected radiation. The processor is controlled by a switch for control and diagnostic purposes. The handheld unit is battery-powered.

The invention also entails a method of detecting radiation as an improvement over prior art methods that merely used scintillators and light sensitive devices such as photodiodes, and arrays of photodiodes to receive the optical light emitted from the scintillator and convert it to an electrical signal for further processing. The inventive method includes providing a high gain amplifier and configuring the high gain amplifier and the light sensitive device in conjunction with the scintillator so that the radiation impacting on one or more semiconductors in the high gain amplifier and photodiode is directly converted into an electrical signal. This signal can then be amplified for indication of the presence of the directly converted radiation. The scintillator can substantially surround the light sensitive device and high gain amplifier to optimize the detection of radiation. Once the radiation is converted to an amplified electrical signal, one or more of an audible, vibratory, or visual signal can be used to indicate the presence and/or the intensity of the directly converted radiation. The amplified electrical signal can be converted to a digital signal and filtered to remove unwanted noise before processing into some form of indication of detected radiation. The scintillator, the photodiode, and high gain amplifier are housed in an optically opaque housing that is preferably sized to be worn on a person's body or hung on a wall or ceiling.

BRIEF DESCRIPTION OF THE DRAWINGS

Reference is now made to the drawings accompanying the invention wherein.

DESCRIPTION OF THE PREFERRED EMBODIMENTS

Figure 1:
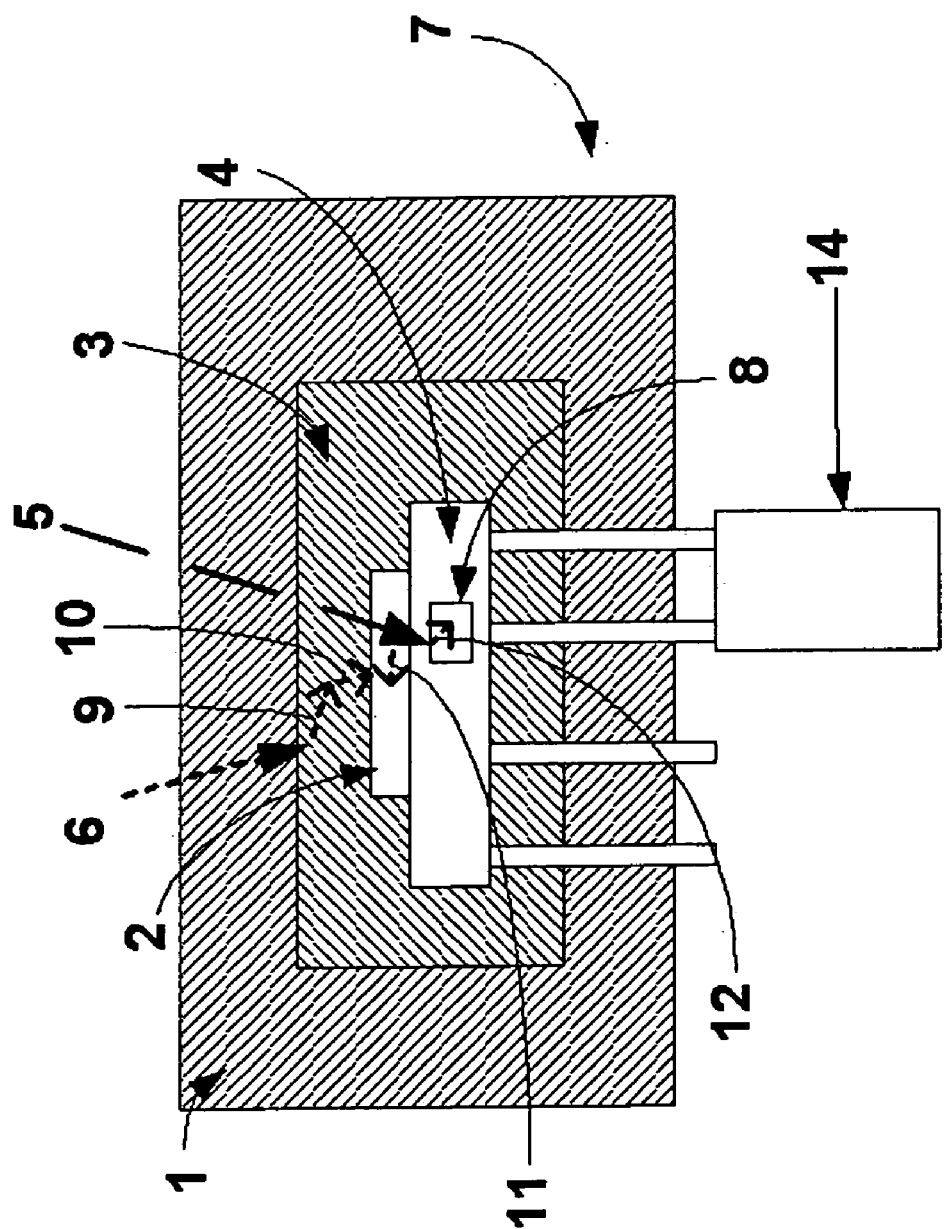
FIG. 1 is a schematic view of essential elements of an Alpha, Beta, Gamma, X-ray, and fast Neutron detector in accordance with a preferred embodiment of the present invention.

In accordance with one embodiment of the present invention, a highly efficient, wide-range detector for radiation from radioactive isotopes such as cesium chloride and strontium is described. An application of the invention is to detect a wide range of radiation by using an integrated direct and indirect conversion type detector and the combination of the foregoing embodiments for highly effective detection of fissionable material such as uranium and plutonium are discussed below.

The inventive detector has a wide range for detecting alpha, beta, gamma, electromagnetic radiation (X-rays) and fast neutrons emitting from natural radioactive isotopes. The detector uses a scintillator such as $Gd_2O_2S$, commonly known referred to herein, as "gadox", to stop both low-energy neutrons and photons. Gadox is well known as a scintillating material for x-rays and is used in x-ray detection applications, such as in sheets for lining the inner surfaces of x-ray detector boxes in x-ray detection products. X-ray-induced scintillations from the gadox in the visible portion of the spectrum are then detected, typically by photodiodes, and CCD arrays. Gadox has a good efficiency for stopping photons of energies below about 100 keV and converting the ionizing radiation energy into optical light that can be detected by a photodiode. It should be understood that any of a photodiode or CCD array, e.g., optical light detectors or light sensitive devices, can be used as part of the invention, providing of course that the device has the requisite semiconductors with depletion regions to provide the direct conversion of radiation to electrical energy for later detection.

Gadox may be doped with various elements, typically rare earths, with the dopants determining the optical spectrum and the lifetime of the optical transitions. $Gd_2O_2S$:Tb is a preferred dopant in that the lifetime of the light output is short, <1.5 mS (depending on the amount of Tb), and the light is emitted primarily at a single wavelength, 545 nanometers (green light), so there is very little "afterglow" that occurs from multiple wave length emission some of which are long lived. It is understood that for purposed of detecting radioactive isotopes and electromagnetic radiation and fissionable material, the use of any dopant falls within the scope of the invention.

While the description provided herein refers to the invention in terms of $Gd_2O_2S$, it is understood that the invention may also be practiced using another x-ray or gamma-ray scintillator material, one of whose constituents is boron, cadmium, gadolinium. Additionally, phosphors containing elements of high-neutron or photon capture cross-section may be employed.

Thus while substantially opaque to neutrons, a gadox screen has a detection efficiency of about 5% for detecting a 100 KeV x-ray or gamma ray. It is almost transparent to photons in the range of 120 KeV and above.

In accordance with further embodiments of the invention, the detection range of the invention is increased for alpha, beta, gamma, fast neutron radiation, and X-rays above about 1 Roentgen. This advantage is achieved by exposing the photodiode and high-gain amplifier to incident ionizing radiation. When a photon strikes a depletion region created by reverse bias on the photodiode, and diodes inside the amplifier, they produce a small amount of charge. The hole electron pairs, and thus charges, can be accumulated across the photodiode, and diodes inside the amplifier, by all forms of ionizing radiation. The resulting signal is then amplified by the integrated high-gain amplifier. The high-gain amplifier is configured to highly amplify the weak charges, e.g., about 5 million times, which is detectable by an A/D converter. The resulting signal from the amplifier is proportional to the intensity of the radiation. The amplifier and photodiode can be used as a direct converter type detector because the invention will not be irritated often or on a continuous basis.

For detection of distant radioactive isotopes or X-rays below 100 keV, e.g., low energy radiation, the invention uses a scintillator to convert the radiation to visible light photons. The photons are detected by the photodiode and converted to electrical signals. The resulting signal is amplified by a high-gain amplifier that can be sampled by the A/D converter.

While the description provided herein refers to the invention in terms of an integrated photodetector and amplifier, it is understood that the invention may also be practiced using discrete photodiodes, arrays of photodiodes and discrete amplifiers so long as they are not shielded from incident radiation.

Referring now to FIG. 1, an exemplary embodiment of the invention shows elements of a wide-range alpha, beta, gamma, x-ray, and fast neutron detector 7, which consists of a scintillator screen 3, such as gadox, wrapped around or surrounding the integrated photodiode 2 and amplifier 4. The scintillator 3, photodiode 2, and amplifier 4 are covered by an optical shield 1, which reflects the internally generated light. This light is viewed by a photodiode 2, and the resulting electrical signal is amplified by amplifier 4 for further processing as noted below. The photodiode 2 and amplifier 4 can be integrated into one package or be separate components. Entirely surrounding the photodiode 2 and amplifier 4 permits a maximum sensitivity to lower levels of radioactivity, e.g., from 2 R/hr. to 100 mR/hr.

The operation of the detector is illustrated in FIG. 1, wherein low-level radiation (<1 R/hr) 6, and high energy radiation (>1 R/hr) 5 impinge on the detector 7. In the indirect conversion mode, the low energy radiation entering the detector 7, enters the gadox 3 along path 6 are absorbed by the $^{157}$Gd and Auger electrons 9 are produced. The electrons 9 stop in the gadox 3 producing optical photons 10. These visible-light photons are captured by the photodetector 2, producing a small signal that is amplified by amplifier 4.

When high energy radiation passes through the gadox 3 along path 5 and strikes a depletion layer (not shown) inside the photodetector 2, producing a small charge or ion 11. The ion has an electron hole associated with it that can conduct electricity causing a current that is amplified by amplifier 4. High energy radiation also passes through the gadox 3, along path 5 and strikes a depletion layer 12, which is inside a diode, inside the amplifier 4, producing a small charge 8 that is amplified by amplifier 4. The signal at the output of the amplifier is processed by the A/D converter and processor 14 so that the appropriate alert can be made regarding the detected radiation.

The inventive detector has wide-range detection abilities for detecting radioactive isotopes and fissionable materials, particularly as a dirty bomb and lost radioactive source detection device. The device uses a combined direct and indirect conversion type detector to detect Alpha, Beta, Gamma, X-Ray and fast neutrons. This device includes a small A/D converter and a processor to analyze the electrical signal from the radiation detector. The device includes visual, aural or vibrating mechanisms to alert the holder of a detected radioactive isotope. All of the components in the device can be sealed in a small non metallic, e.g., ABS, pager-style case that can be used on a key chain or clipped-on the holder.

Figure 2:
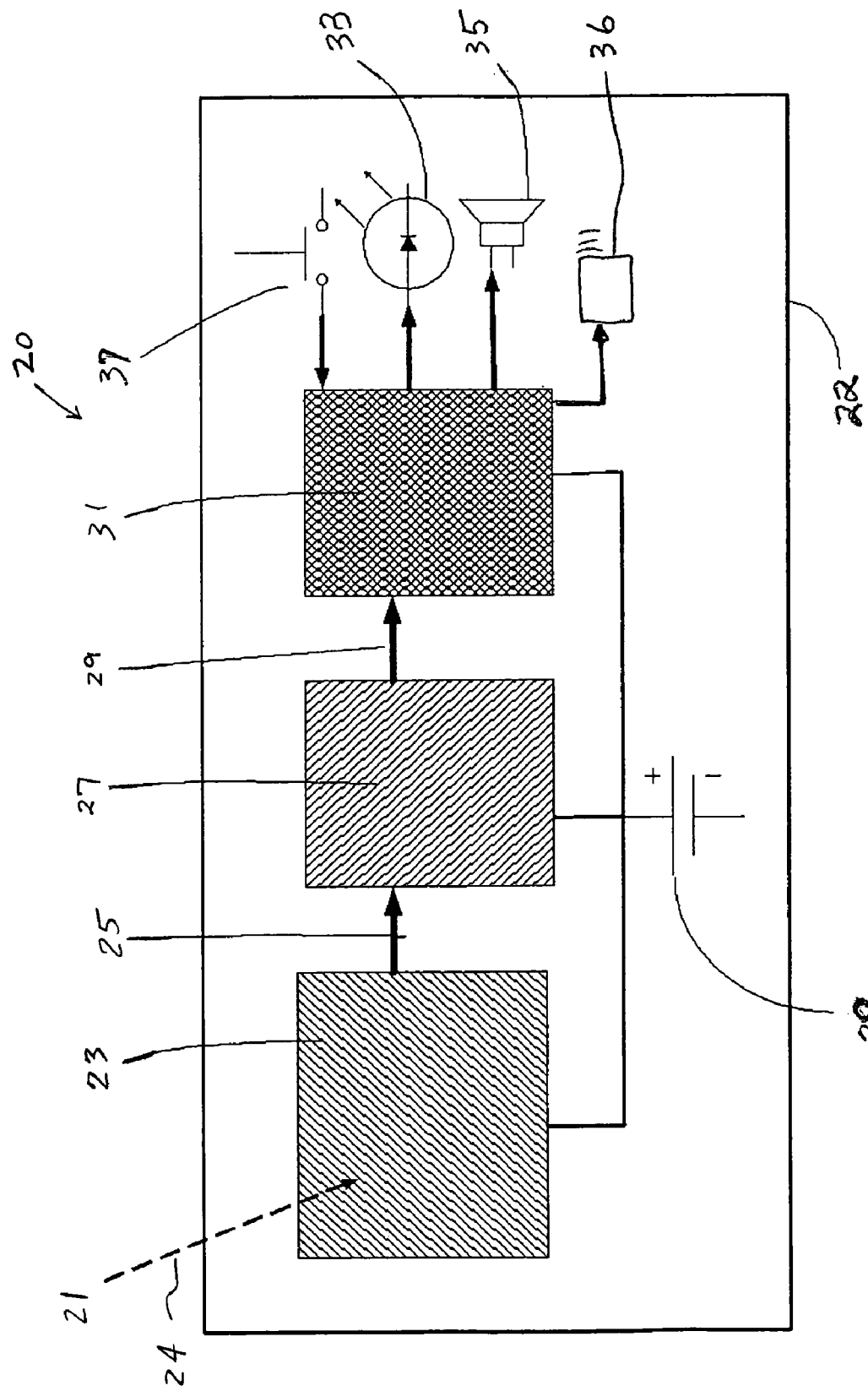
FIG. 2 is a schematic view of essential elements of a complete radiation warning device in accordance with a preferred embodiment of the present invention.

An example of such a dirty bomb detection device is shown in FIG. 2 and designated by the reference numeral 20. Radiation 21 passing through an ABS device housing 22, then enters the Alpha, Beta, Gamma, X-Ray, and fast Neutron Detector 23 along path 24. The detector 23 produces a small signal (mV range) 25, proportional to the intensity of the radiation. A/D converter 27 converts the analog signal 25 to a digital signal 29. Processor 31 contains firmware to eliminate noise in the digital signal 29.

In an exemplary control sequence, if processor 31 determines that there is a radioactive isotope nearby, then it will flash light 33 and/or sound buzzer 35 with a frequency proportional to the intensity of the radiation 21. In an alternative mode, the buzzer 35 or light 33 could be used just to indicate the detection of radiation, or the light 33 could indicate just radiation presence, and the buzzer 35 could reflect the intensity. Other combinations could be used as would be within the skill of the art.

In one mode, if radiation 21 is present when the switch 37 is closed then the processor 31 can flash the light 33, sound the buzzer 35, and/or activate the vibrator 36 in a predefined pattern to report to the holder the intensity of the radiation 21. If radiation 21 is not present when the switch 37 is closed then the processor 31 can turn on the light 33 so that device 20 can be used as a flashlight. The processor 31 will delay turning off the light 33 when the switch 37 is opened to demonstrate that the device is fully functional. A battery 39 powers the electronics inside the device 20, although a hardwired source of electrical power could be employed if the detector was designed to remain stationary, e.g., on a wall, ceiling or other structure where radiation detection would be important. It should be understood that this control sequence is one preferred mode, and others could be used as would be within the skill of the art.

The A/D converter and processor can be integrated into one package or be separate components. Also, the processor can be a microcontroller or microprocessor.

As such, an invention has been disclosed in terms of preferred embodiments thereof, which fulfills each and every one of the objects of the present invention as set forth above and provides a new and improved method and device of detecting radiation.

Of course, various changes, modifications and alterations from the teachings of the present invention may be contemplated by those skilled in the art without departing from the intended spirit and scope thereof. It is intended that the present invention only be limited by the terms of the appended claims.

What is claimed is:

1. In a method of detecting radiation by exposing a scintillator to radiation, sensing optical light emitted from the scintillator using at least one light sensitive device, and producing an indication of the radiation based on output from the light sensitive device, the improvement comprising providing a high gain amplifier and configuring the high gain amplifier and the light sensitive device in conjunction with the scintillator so that the radiation impacting on one or more semiconductors in the high gain amplifier and the light sensitive device is directly converted into an electrical signal which can then be amplified for indication of the presence of the directly converted radiation.

2. The method of claim 1, wherein the scintillator substantially surrounds the light sensitive device and high gain amplifier.

3. The method of claim 1, wherein the electrical signal is amplified by the high gain amplifier.

4. The method of claim 1, wherein one or more of an audible, vibratory, or visual signal is used to indicate the presence of the directly converted radiation.

5. The method of claim 1, wherein a noise present with the detected radiation is filtered prior to indicating presence of the radiation.

6. The method of claim 1, wherein at least an intensity of the detected radiation is indicated by one or more of an audible, vibratory, or visual signals.

7. The method of claim 6, wherein a presence and an intensity of the detected radiation is indicated by one or more of an audible, vibratory, or visual signals.

8. The method of claim 1, wherein the scintillator, the light sensitive device, and high gain amplifier are housed in an optically opaque housing.

9. In a radiation detector having a scintillator and at least one light sensitive device encased in an optically opaque housing, the light sensitive device sensing optical light emitted from the scintillator as a result of radiation impacting the scintillator and generating an electrical signal representative of the detected radiation, the improvement comprising providing a high gain amplifier coupled to the light sensitive device, the high gain amplifier and light sensitive device configured with the scintillator so that radiation can impinge on each of the high gain amplifier, light sensitive device and scintillator so that high levels of radiation can be directly converted to electrical signals using semiconductor material in the light sensitive device and high gain amplifier.

10. The detector of claim 9, further comprising means for indicating at least the presence of the directly converted radiation.

11. The detector of claim 10, wherein the indicating means comprises one or more of an audio, visual, or vibratory signal.

12. The detector of claim 9, wherein the indicating means indicates the presence and intensity of the directly converted radiation.

13. The detector of claim 9, further comprising an analog to digital signal converter to convert analog signals produced by the amplifier to digital signals.

14. The detector of claim 13, further comprising a microprocessor for filtering noise from the digital signal.

15. The detector of claim 9, wherein the light sensitive device is one of a photodiode, an array of photodiodes, or one or more CCD devices.

16. The detector of claim 9, wherein the scintillator is a rare earth phosphor.

17. The detector of claim 16, wherein the light sensitive device and high gain amplifier are an integral unit.

18. The detector of claim 9, wherein the scintillator surrounds the light sensitive device and high gain amplifier.

19. A hand-held device for detecting ditty bombs and lost radioactive isotopes comprising:

a housing having a wall made of a predominantly epoxy composite material binder capable of withstanding temperatures from −50 to +70 degrees Celsius and sufficiently thick to withstand vibrations and optically opaque;

the radiation detector of claim 9 disposed in said housing;

an A/D converter disposed in said housing and coupled to the radiation detector;

a processor disposed in said housing and interfaced to the A/D converter for filtering ambient noise from detected radioactivity and control alarm indicator states;

a light, buzzer, or vibrating mechanism disposed in said housing and interfaced to the processor for alerting the holder to detected radiation;

a switch disposed in said housing and interfaced to the processor for control and diagnostic purposes; and a battery disposed in said housing to power all components inside the housing.

* * * * *